3,122,136
CATHETER PRESSURE STANDARD
William P. Murphy, Jr., Miami, Fla., assignor to Cordis Corporation, Miami, Fla., a corporation of Florida
Filed June 16, 1961, Ser. No. 117,596
6 Claims. (Cl. 128—2.05)

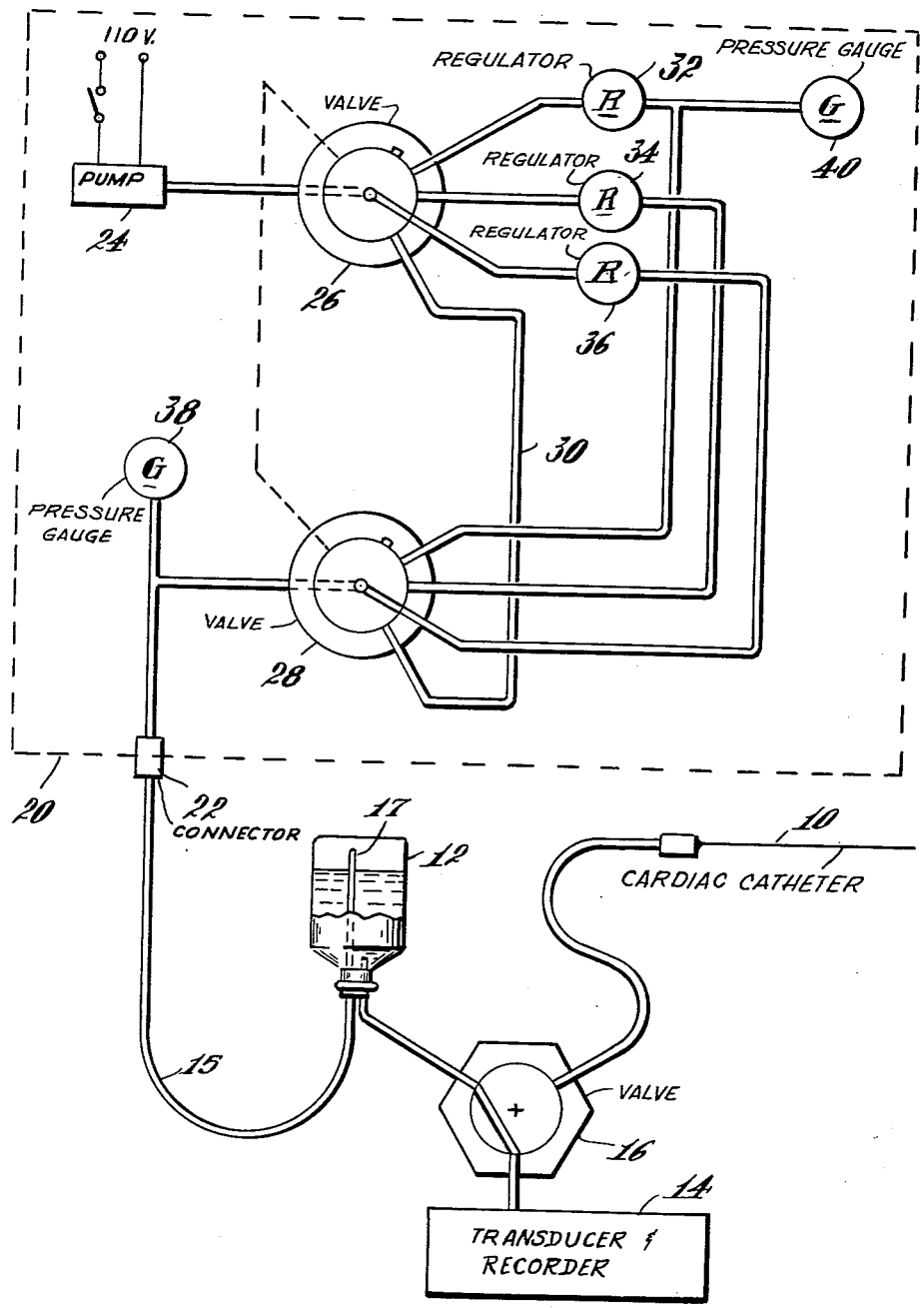

This invention relates to cardiac catheter systems and more particularly to such a system which includes a pressure standard for transducer calibration.

By means of a thin, flexible tube known as a catheter it is possible to measure the cyclic changes of pressure within a beating heart. This tube may be worked into the chambers of the heart itself, usually through a blood vessel from a point on the patient's arm or leg. As the manipulation of the catheter takes considerable time, a flow of intravenous fluid must be maintained through the tube to prevent the clotting therein of blood. After the catheter is suitably located, the pressure fluctuations within the heart itself are transmitted hydraulically and with substantial accuracy through the catheter and are measured by a transducer at its outside end. During the actual measurement, the transient flow of fluid through the catheter due to the pulsating pressures must be minimized so as to reduce frictional errors which would otherwise be introduced by the pressure drop developed over the length of the catheter by such flow. For this reason a stiff transducer, that is one having a very low compliance, is employed. A strain gauge is one such a transducer As the readings from these transducers and related electronic recorders tend to drift it is necessary, only shortly before making the actual measurements, to establish reference points which correspond to known pressures. Heretofore, the pressure necessary to force the intravenous fluid through the catheter and the pressures used for standardizing the transducer were obtained by pressurizing the intravenous bottle with a conventional squeeze bulb equipped with a pressure gauge. However, especially with a nearly full bottle, the pressure would drop off quickly as fluid was used. Further, as the system tended to be hydraulically "soft," the achievement of a particular pressure was extremely difficult and standardization of the transducer was rendered correspondingly complicated and somewhat inaccurate.

Objects of the present invention are to provide a cardiac catheterization system in which a steady flow of fluid through the catheter may be easily maintained during manipulation thereof, in which the measuring transducer may be quickly and accurately calibrated, in which the transducer may be calibrated for a plurality of pressures, and which is easily operated.

The present invention accordingly contemplates a cardiac catheterization system which includes a continuously driven pump for maintaining a constant flow of fluid through the catheter during its manipulation and a plurality of pressure regulators any one of which may easily be brought into operation for providing a reference pressure to which the transducer may be calibrated.

For purposes of illustration a preferred embodiment of the invention is shown in the accompanying drawing which is a diagrammatic representation of a cardiac catheterization system.

Referring now to the drawing a cardiac catheter 10, an intravenous bottle 12 containing for example a normal saline solution, and a transducer and recorder assembly 14 are interconnected by means of a three-way valve 16. The transducer may be of any type having a compliance sufficiently low enough to minimize frictional errors due to the transient flow of fluid through the catheter. The recorder likewise may be of any convenient and conventional type. The design of the valve is such that any two of the three items may be connected. In the obtaining of the actual measurements it is preferable that the transducer and the surface of the saline solution be at substantially the same level as the patient so that no hydrostatic head of pressure is exerted upon the transducer but rather that the only pressures recorded are those supplied by the pressure standard apparatus hereinafter described and by the patient's circulatory system.

For applying pressure to the catheter hydraulic system there is provided a pneumatic pressure standard 20 whose outlet 22 is connected to the bottle 12 by a length of flexible tubing 15. Preferably a length of tubing 17 permits the pressurizing air to vent above the level of the saline solution. The pressure standard 20 includes an electrically driven air pump 24 which is adapted to be run continuously during the catheterization procedure thereby insuring a constant flow of fluid through the catheter.

By means of the two linked multiposition valves 26 and 28 the pump 24 may be connected to the outlet 22 either through the direct line 30 or through any one of the adjustable pressure regulators 32, 34 and 36 or it may be closed off altogether. The unused regulators are switched completely out of the pneumatic circuit at both sides so that reflux action will not upset the adjustment of the one in use.

A gauge 38 by which the various regulators may be adjusted is connected to the pneumatic system adjacent the outlet. Preferably there is also provided a gauge 40 which registers a smaller range of pressures than the gauge 38. This gauge 40 is connected to that regulator which is adjusted for the lowest pressure so that a greater resolution of pressure may be obtained at the lower pressure levels.

In use the three-way valve 16 would first be set so as to connect the bottle 12 and the catheter 10 and the valves 26 and 28 would be set to supply whatever pressure is needed to maintain a flow through the catheter as it is worked into a patient's body. If necessary the full, unregulated pressure of the pump 24 could be used.

When the tip of the catheter has reached the point within the body of the patient at which the pressure measurements are to be taken, the three-way valve is turned so as to connect the transducer directly to the intravenous bottle. The doctor may then work the selector on the pressure standard so that the transducer is exposed to each of the three regulated pressures in turn, taking or recording a corresponding reading from the transducer for each pressure. In this way a correspondence between the transducer readings and the true pressures is obtained, the readings for pressures between the three being obtainable by interpolation. It should be understood that this calibration process can be carried out quite quickly without danger of clotting within the catheter.

Having completed the standardization the doctor may then immediately turn the three-way valve so that the catheter is connected directly to the transducer. As the cushioning influence of the intravenous bottle is then removed, the transducer will produce a signal which is a substantially accurate representation of the instantaneous pressures present at the tip of the catheter. Further, since the transducer has been calibrated just before recording the cyclic pressures, the representation is complete as to actual values of pressure as well as relative values.

As an additional check on the accuracy of the calibration and as a means for compensating for any drift occurring during the taking of the readings, the calibration procedure may be repeated immediately following the measurements. It is an advantage of the present invention that both checks may be performed quickly and yet accurately thereby avoiding both the possibility of excessive signal drift and the danger of clotting.

I claim:

1. A cardiac catheterization system comprising a catheter adapted to be inserted into a patient's circulatory system, an external hydraulic transducer of low compliance, a fluid reservoir for providing fluid for flushing said catheter, means for selectively interconnecting said catheter, said transducer, and said reservoir, and means for selectively applying to said transducer through said reservoir any one of a plurality of preselected, regulated hydraulic pressures.

2. In a cardiac catheterization system for measuring the instantaneous hydraulic pressure at various points within a patient's circulatory system using an external hydraulic transducer having a very low compliance, a pressure standard comprising an air pump, a plurality of air pressure regulators, means for selectively connecting any one of said regulators to the outlet of said pump, and means for selectively connecting the output of the selected regulator to the transducer hydraulic system.

3. In a cardiac catheterization system for measuring the instantaneous hydraulic pressures existing within a patient's circulatory system using an external hydraulic transducer having a low compliance, pressure standardizing apparatus comprising an air pump, a plurality of air pressure regulators, an outlet by which the pressure standardizing apparatus can be selectively connected to the transducer hydraulic system, and means for connecting said outlet to said pump through a selectable one of said regulators.

4. In a cardiac catheterization system for measuring the instantaneous hydraulic pressures existing within a patient's circulatory system using an external hydraulic transducer having a low compliance, pressure standardizing apparatus comprising an air pump, an outlet by which the pressure standardizing apparatus can be selectively connected to the transducer hydraulic system, a plurality of adjustable air pressure regulators, a gauge by which said regulators may be adjusted, means connecting said outlet and said pump, and means for selectively interposing in said means a selected one of said regulators.

5. In a cardiac catheterization system for measuring the instantaneous hydraulic pressures existing wtihin a patient's circulatory system using an external hydraulic transducer having a low compliance, pressure standardizing apparatus comprising an air pump, an outlet by which the pressure standardizing apparatus can be selectively connected to the transducer hydraulic system, a plurality of adjustable air pressure regulators, an air pressure gauge connected to said outlet by which said regulators may be adjusted, conduit means for directly connecting said outlet and said pump, valve means for selectively connecting said pump to said conduit means and to each of said regulators, and valve means for selectively connecting said outlet to said conduit means and to each of said regulators.

6. Pressure standardizing apparatus according to claim 5 including an air pressure gauge of smaller range than said gauge connected to the outlet of one of said regulators.

References Cited in the file of this patent
UNITED STATES PATENTS

| | | |
|---|---|---|
| 2,535,998 | Bierman | Dec. 26, 1950 |
| 2,600,324 | Rappaport | June 10, 1952 |